United States Patent
Knab et al.

(10) Patent No.: US 6,686,669 B1
(45) Date of Patent: Feb. 3, 2004

(54) METHOD AND DEVICE FOR OPERATING AN ADJUSTING DRIVE IN A MOTOR VEHICLE

(75) Inventors: Norbert Knab, Appenweier (DE); Ralf-Michael Bartke, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/646,375

(22) PCT Filed: Nov. 18, 1999

(86) PCT No.: PCT/DE99/03660
§ 371 (c)(1),
(2), (4) Date: Nov. 1, 2000

(87) PCT Pub. No.: WO00/43227
PCT Pub. Date: Jul. 27, 2000

(30) Foreign Application Priority Data

Jan. 19, 1999 (DE) .......................................... 199 01 855

(51) Int. Cl.$^7$ ................................................. G05B 5/00
(52) U.S. Cl. ........................ 307/9.1; 307/10.1; 318/445; 701/49
(58) Field of Search ................................. 307/9.1, 10.1; 318/447, 456, 465, 286, 139, 445; 701/36, 49

(56) References Cited

U.S. PATENT DOCUMENTS

| | | | | |
|---|---|---|---|---|
| 5,610,484 A | * | 3/1997 | Georgin | 318/286 |
| 5,616,997 A | * | 4/1997 | Jackson et al. | 318/286 |
| 5,801,501 A | * | 9/1998 | Redelberger | 318/283 |
| 5,982,124 A | * | 11/1999 | Wang | 318/286 |
| 6,064,165 A | * | 5/2000 | Boisvert et al. | 318/465 |
| 6,070,116 A | * | 5/2000 | Pruessel et al. | 701/49 |
| 6,138,068 A | * | 10/2000 | Liu | 701/49 |
| 6,236,176 B1 | * | 5/2001 | Uebelein et al. | 318/287 |
| 6,298,295 B1 | * | 10/2001 | Tyckowski | 701/49 |
| 6,329,779 B1 | * | 12/2001 | Pimley et al. | 318/465 |
| 6,366,040 B1 | * | 4/2002 | McLennan et al. | 318/280 |
| 6,408,238 B1 | * | 6/2002 | Lamm et al. | 701/49 |
| 6,456,027 B1 | * | 9/2002 | Pruessel | 318/445 |
| 6,472,836 B1 | * | 10/2002 | Uebelein et al. | 318/445 |

FOREIGN PATENT DOCUMENTS

| | | | |
|---|---|---|---|
| DE | 40 00 730 | 8/1991 | |
| DE | 40 20 351 | 1/1992 | |
| DE | 295 14 786 | 10/1996 | |
| DE | 196 15 123 | 7/1997 | |
| JP | 10 054 175 | 2/1998 | |
| WO | WO 96 35 036 | 11/1996 | |
| WO | WO 97/39509 | * 10/1997 | .......... H02H/7/085 |

* cited by examiner

Primary Examiner—Brian Sircus
Assistant Examiner—Roberto J. Rios
(74) Attorney, Agent, or Firm—Kenyon & Kenyon

(57) ABSTRACT

In a method for operating an actuating device in a motor vehicle including the steps of measuring an actuating force exerted by the actuating drive, comparing the actuating force to a limit force, and reversing the actuating drive if the limit force is exceeded, provision is made that, while the motor vehicle is being driven, the measured values of the actuating force are filtered, prior to the comparison operation, in accordance with a first method, to suppress rapid changes in the actuating force on the basis of the path covered by the actuating drive, and, while the motor vehicle is at rest, with the engine turned off, in accordance with a second method where rapid changes are suppressed to a lesser extent than in the first method, or not filtered at all. A device for carrying out the method is specified.

9 Claims, 1 Drawing Sheet

FIG. 1

METHOD AND DEVICE FOR OPERATING AN ADJUSTING DRIVE IN A MOTOR VEHICLE

FIELD OF THE INVENTION

The present invention relates to a method and a device for operating an actuating drive in a motor vehicle. Devices of this kind are used for controlling the actuating drives of window lifters, sliding sunroofs, etc.

BACKGROUND INFORMATION

Such a method and device, respectively, are described in German Patent No. 19615123. To be more precise, this document deals with a device and a method for electronically monitoring an actuating drive mounted in a vehicle, the device monitoring an actuating force exerted by the actuating drive to prevent the actuating force from exceeding a limiting value. The aim is to prevent injury to a person caught in the closing area of the window or sliding sunroof operated by the actuating drive, or damage to the actuating drive. In this context, the problem arises that external shocks which the vehicle is subject to, for example, due to unevenness of the road being driven on, interfere with the measurement of the actuating force by inducing inertial forces in the actuating drive or in the part actuated thereby.

According to German Patent No. 19615123, the intention is for this problem to be solved by using the speedometer signal of the vehicle as input variable for the control of the actuating drive, namely in that a higher limiting value is input while the vehicle is being driven than while the vehicle is at rest.

However, this approach is not completely satisfactory. The moments of inertia induced by shocks can reach considerable levels. To prevent the closing-force limiter from responding incorrectly because of such a shock, the limiting value must be selected considerably higher while the vehicle is being driven than is desirable for effectively protecting persons from injuries.

A further method and a device for operating an actuating drive in a motor vehicle are known from German Patent No. 4000730. In the case of this method and this device, provision is made to acquire a characteristic quantity having a relation to the actuating force of the part driven by the actuating drive, and to measure the path covered by the part. On the basis of this data, the characteristic quantity is differentiated with respect to path. The value of this derivative is monitored, and the actuating drive is reversed or stopped when a limiting value of the derivative is exceeded.

In this device, the exceeding of the limiting value which results in the stopping or in the reversing of the actuating drive does not necessarily coincide with the exceeding of a maximum closing force. Besides, the derivative necessarily responds to fast changes in force, as are caused in particular by exterior shocks, in a significantly more sensitive manner as the characteristic quantity from which it is calculated. To compensate for this, signal filtering is required in determining the curve of the characteristic quantity.

SUMMARY OF THE INVENTION

The present invention provides a method and a device, respectively, for operating an actuating drive, allowing disturbances due to shocks to be suppressed in a manner adapted to the motional condition of the motor vehicle while complying with fixed limiting values of the exerted actuating force at the same time. This is achieved in that, to suppress fast changes in the actuating force which are caused by shocks, different filtering methods are used as a function of the motional condition of the motor vehicle, it being possible for the suppression to be weaker while the vehicle is at rest because of the lower probability of shocks than while the vehicle is being driven, or to be completely omitted.

The ignition of the motor vehicle can be easily used as a criterion for changing between the two filtering methods.

The first filtering method, which is used while the vehicle is being driven or while the engine of the vehicle is running, preferably filters out increases in the actuating force which exceed 20 N/mm. Changes in the actuating force which are due to an exterior shock generally manifest themselves by fast changes in the actuating force. Taking a spring rate of 20 N/mm as a basis, the device according to the present invention is moreover capable of observing the increase in the actuating force over a travel of at least 5 mm before a maximum force of 100 N is reached, at which the actuating drive shall reverse according to the legal regulation. A great number of force-measuring values can be taken on these 5 mm so that the exerted force can be exactly estimated, possibly by messaging, interpolation, etc., even under the influence of external disturbances.

A significantly higher spring rate of 65 N/mm can be used when the vehicle is at rest. In such conditions, the filtered signal can increase from 0 to 100 N over a length of travel of 1.3 mm. However, since substantially no shocks are to be expected while the vehicle is at rest, it is less important to acquire a great number of measuring values for the purpose of averaging fluctuations. In this case, therefore, the length of travel is sufficient for an accurate measurement.

DETAILED DESCRIPTION

Figure 1:
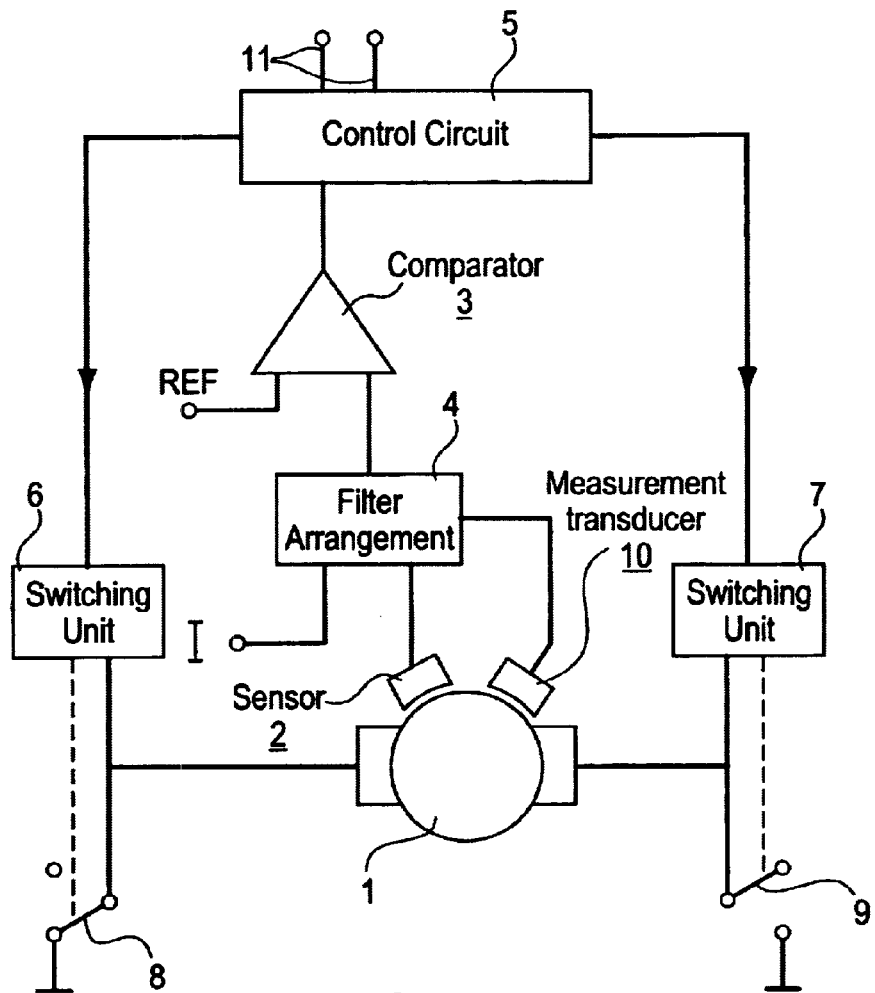
FIG. 1 shows schematically a circuit arrangement of a device for operating an actuating drive in a motor vehicle, the device being suitable for carrying out the method according to the present invention.

An actuating drive 1 of the device shown in the Figure is provided for opening and closing an object, such as a windowpane or a sliding sunroof, via a mechanism which is not shown. When actuating drive 1 is driven in the closing direction, a sensor 2 measures the actuating force exerted by the actuating drive and generates a signal which is representative of the actuating force, the signal being applied to a signal input of a filter arrangement 4. In this context, the value of the force can be represented, in particular, by a level or a pulse train of the signal. Sensor 2 can be, for example, a piezoelectric sensor which is mounted at a suitable location on actuating drive 1 or on the driving mechanism, where it is directly subject to the actuating force and delivers a signal which is representative of the actuating force. Alternatively, sensor 2 can also monitor the current input of actuating drive 1, thus ascertaining the actuating force indirectly. Basically, any kind of sensor is suitable whose output signal allows the actuating force to be ascertained unambiguously. For example, it is also possible to use a Hall-effect sensor which measures the speed of the actuating drive, thus enabling determination of the velocity or of the acceleration of the driving mechanism. An evaluation can unambiguously calculate the driving force from this acceleration.

Filter arrangement 4 has a control input to which a signal I is applied whose level is coupled to the ignition of the motor vehicle. If signal I indicates that the engine of the motor vehicle is running, the signal coming from sensor 2 is filtered according to a first method in the case of which filter arrangement 4 applies a transfer function to the signal delivered by sensor 2, the transfer function having the location of the pane to be closed as a parameter. For this purpose, a measurement transducer 10 is connected to filter arrangement 4, the measurement transducer, for example by monitoring a rotary motion of a driving shaft of actuating drive 1, generating a signal which is representative of the motion of the pane to be closed. In the signal delivered by sensor 2, increases in the actuating force with the location of more than 20 N/mm are suppressed by filter arrangement 4. In this manner, increases are filtered out which are due to external shocks, for example, while the vehicle is traveling on uneven ground, or which could result from a jamming of an object which is harder than a human body part, and which is therefore not relevant for an effective injury protection of persons.

If signal I indicates that the engine of the motor vehicle is at rest, then filter arrangement 4, according to a first variant of the method, uses a second method in the case of which increases in the actuating force are filtered out only if they correspond to an increase in the actuating force by more than 65 N/mm. Alternatively, a filtering of the signals delivered by sensor 2 can be completely omitted so that the signals pass unchanged through filter arrangement 4 and are routed to a comparator 3. Comparator 3 compares the output signal of filter 4 to a reference value REF to which a preselected threshold value of the actuating force corresponds which can maximally be 100 N according to the legal regulation. This threshold value and, consequently, the reference value can be preselected differently. Since substantially no disturbances due to shocks are detected while the vehicle is at rest, the threshold value can in this case be set lower than while the vehicle is being driven.

The output signal of the comparator, which indicates the exceeding of the in each case applying maximum force, is fed to a control circuit 5 which, via control inputs 11, receives commands of a user to open or to close a window connected to actuating drive 1. Depending on the desired moving direction, control circuit 5 activates one of two switching units 6, 7. The switching units each have a line output for feeding actuating drive 1 with a driving current, and a control output which controls the position of a switch 8, 9 allocated to the switching unit. The Figure shows switching unit 6 in the inactive condition and switching unit 7 in the active condition. Switch 8 allocated to switching unit 6 connects the power output of switching unit 6, and thereby a terminal of actuating drive 1, to ground; switch 9 is open so that a supply current output by switching unit 7 flows through actuating drive 1 and switch 8 toward ground. In this condition, the pane driven by actuating drive 1 moves in the closing direction. If now, comparator 3 indicates an exceeding of the threshold value of the actuating force, which is coded by $U_{REF}$, control circuit 5 deactivates switching unit 7 and activates switching unit 6, whereupon switches 8, 9 reverse their positions, respectively. Now, a current flows through actuating drive 1 in the opposite direction, and the pane opens again.

Figure 2:
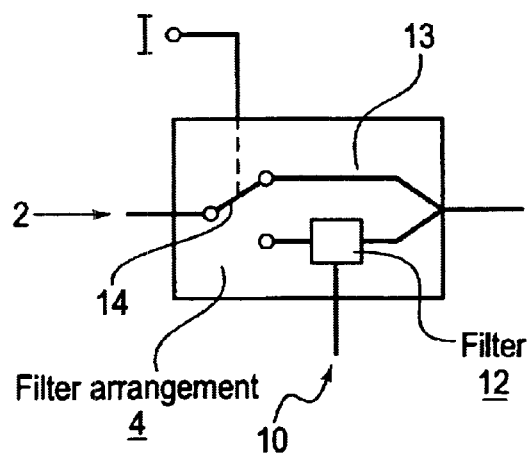
FIG. 2 shows a filter arrangement which is part of the device from FIG. 1.

Filter arrangement 4 can be designed in a different manner. A simple variant is shown in FIG. 2. This arrangement includes a filter 12 which is capable of processing the signal delivered by sensor 2 on the basis of the location information delivered by measurement transducer 10, a simple line 13, and a switch 14 which, controlled by signal I, connects sensor 2 either to line 13 or to filter 12. Such a simple embodiment can be sufficient especially when a limited location resolution of sensor 2 and of measurement transducer 10 already results in that increases in the actuating force of more than 65 N/mm cannot be detected.

Of course, line 13 can be replaced with a second filter which carries out a filtering according to the second method.

A further alternative is the use of a programmable filter as a filter arrangement, the programmable filter receiving parameters of its transfer function via programming inputs as a function of the level of signal I.

The coupling of the used filtering method to the condition of the ignition of the motor vehicle is preferred because of its simplicity since a signal which is coupled to the ignition and has two levels exists in the electric system of any motor vehicle and needs only to be led to the filter unit. Alternatively, signal I can also be obtained from a monitoring of the motional condition of the motor vehicle. In such a case, the filtering could be carried out according to the first method even when the vehicle is at rest with the engine turned on.

What is claimed is:

1. A device for operating an actuating drive in a motor vehicle including an engine, comprising:
   at least one sensor for delivering a signal corresponding to an actuating force exerted by the actuating drive;
   a filtering arrangement for performing a filtering operation according to a first method to suppress rapid changes in the actuating force while the motor vehicle is being driven and for performing the filtering operation according to a second method while the motor vehicle is at rest, with the engine turned off;
   a comparator for receiving the filtered signal via the filtering arrangement and comparing the filtered signal to a limiting value; and
   a control circuit for controlling the actuating drive on the basis of a signal delivered by the comparator.

2. The device according to claim 1, wherein:
   the filtering arrangement includes an input for a control signal that indicates whether the engine of the motor vehicle is ignited, and
   the filtering arrangement performs the filtering operation according to one of the first and the second method, depending on a condition of the control signal.

3. The device according to claim 1, wherein the at least one sensor is arranged to be directly subject to the actuating force.

4. The device according to claim 3, wherein the at least one sensor include a piezoelectric sensor.

5. The device according to claim 1, wherein the at least one sensor is arranged to ascertain the actuating force indirectly.

6. The device according to claim 5, wherein the at least one sensor includes a Hall-effect sensor.

7. The device according to claim 1, wherein the signal is represented by one of a level and a pulse train.

8. The device according to claim 1, further comprising:
   a measurement transducer for monitoring a rotary motion of the actuating drive.

9. The device according to claim 1, wherein the actuating drive operates one of a window pane and a sliding sunroof.

* * * * *